Figure 5:
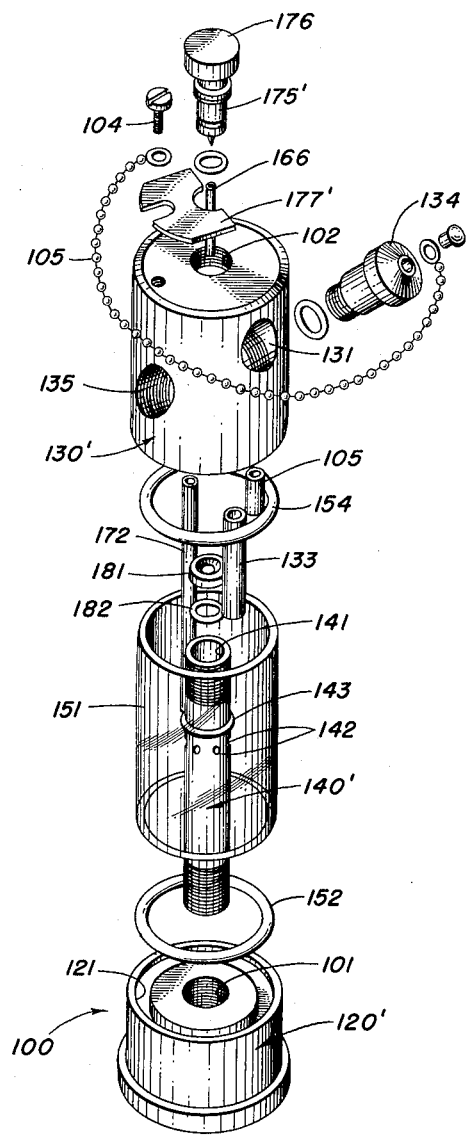

Nov. 21, 1961    J. J. SHADA    3,009,542
LIQUID MIST GENERATING DEVICE
Filed Dec. 29, 1958    2 Sheets-Sheet 1
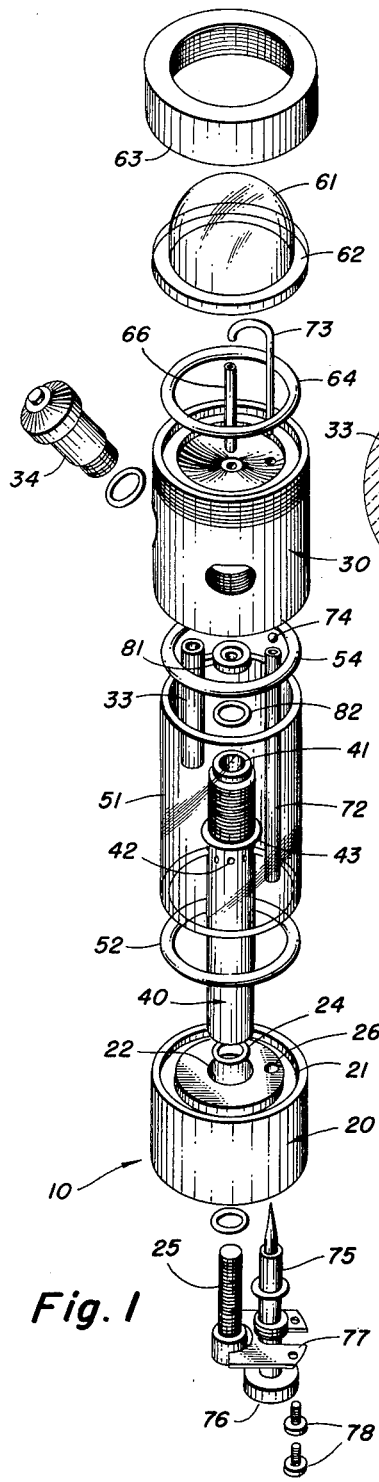
Fig. 1
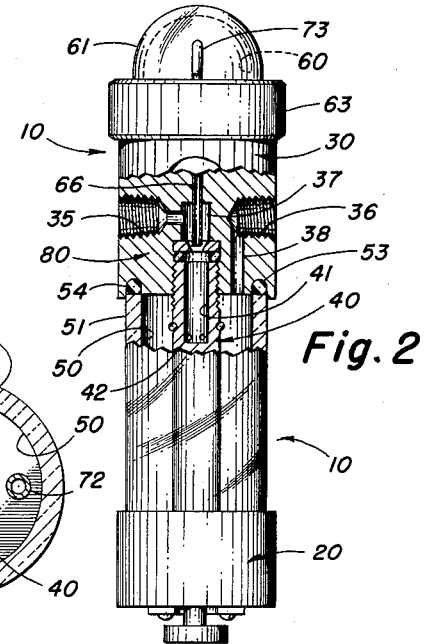
Fig. 2
Fig. 4
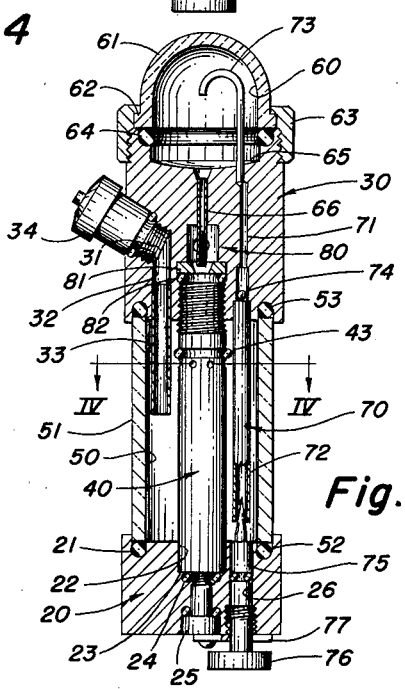
Fig. 3
INVENTOR.
Joseph J. Shada
BY
Price and Heneveld
ATTORNEYS INVENTOR.
Joseph J. Shada
BY
Price and Heneveld
ATTORNEYS

United States Patent Office 3,009,542
Patented Nov. 21, 1961

3,009,542
LIQUID MIST GENERATING DEVICE
Joseph J. Shada, Grand Rapids, Mich., assignor to International Basic Economy Corporation, New York, N.Y., a corporation of New York
Filed Dec. 29, 1958, Ser. No. 783,418
4 Claims. (Cl. 184—55)

This invention relates to aerating and atomizing devices used to produce a liquid mist or fog. More particularly, this invention relates to improvements in liquid mist generators for obtaining a more readily controllable and uniform liquid mist or fog.

Aerators and liquid atomizers are used to combine a liquid with an aeriform fluid, such as air or gas. Frequently the air or gas is under pressure and serves as a carrier for the minute liquid droplets that are produced. Such devices include liquid insecticide sprayers, means of injecting an aerated anti-freeze solution within a gas to prevent freeze-up, air line lubricators, and many others.

The merits of this invention will be best understood and appreciated as described in one of its working embodiments. For this reason the invention is hereinafter described as used within an air line lubricating device.

Air line lubricators are frequently employed in air line connections to pneumatic tools. Such lubricators are particularly well suited for use with high speed pneumatic tools. They eliminate the need for extraneous lubrication fittings and hose connections at the tool and they assure a supply of lubricant directly to the air powered parts of the tool, where most needed.

Air line lubricators are particularly useful with small high speed pneumatic tools, such as dentistry drills. In such instances the small size of the tool, its use within a person's mouth, etc., precludes the use of conventional lubrication fittings, hose connections, and the like. Furthermore, the high speed of the tool requires that its moving parts receive continuous lubrication while the tool is in operation.

The preferred form of air line lubricator, for small high speed pneumatic tools, is a self-contained unit which may be mounted near the work tool. A lubricant reservoir is provided and includes means for injecting small amounts of lubricant into the passing air stream where it is broken up and carried on as a fine mist or fog. Previous devices of this type have included a capillary saturated wick interposed in the air stream and venturi suction types. One of the problems in such devices has been regulating the flow of lubricant to adequately saturate the passing air and without overdoing it and having undue lubricant fall out of suspension before reaching its objective.

It is an object of this invention to disclose a form of aerating device in which all of the air line air passes through the device.

It is also an object of this invention to disclose an aerator in which all of the air passing therethrough passes by the liquid supply source.

Another object of this invention is to disclose an aerator or liquid atomizer having means for regulating the amount of liquid to be injected into the passing air or gas flow stream.

Still another object of this invention is to disclose an aerator having novel means of suspending the liquid within the passing air stream.

A further object of this invention is to disclose a liquid fog generating device having turbulating or centrifuge means of separating out liquid droplets which are not capable of remaining in suspension and for doing so prior to their leaving the fog generating device.

A still further object of this invention is to disclose an aerator having separator means closely associated with the liquid reservoir.

Also among the objects of this invention is to disclose a simple and compact aerating device having no unduly complicated parts to machine and being readily assembled and disassembled for inspection, repair, cleaning, etc.

These and other objects and advantages in the practice of this invention will be more apparent in the illustration and description of a working embodiment of the invention, as hereinafter set forth.

Figure 6:
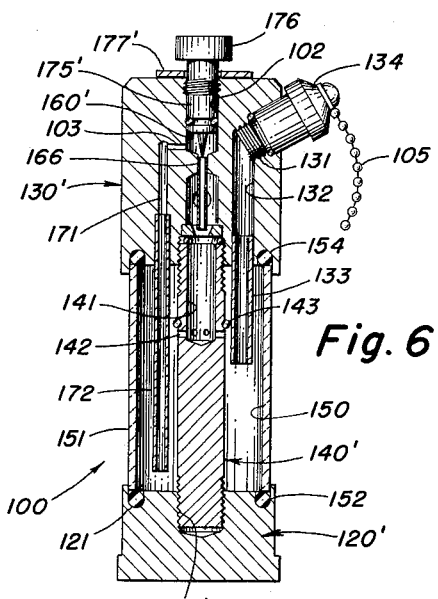
Figure 7:
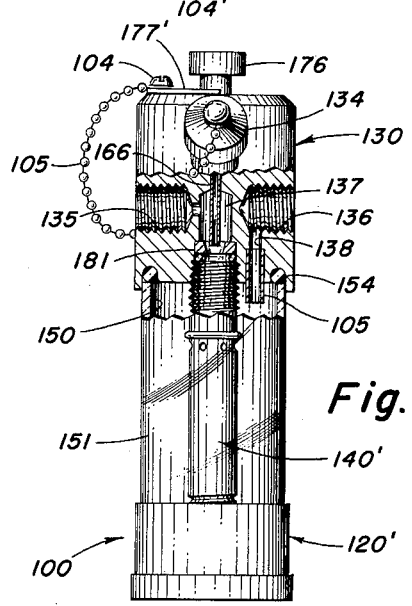

In the drawings:
FIG. 1 is an exploded view of an air line lubricator including the novel features of this invention.
FIG. 2 is a side plan view of the lubricator of this invention with parts broken away and shown in cross section.
FIG. 3 is a cross sectional side plan view of the lubricator of this invention as seen in a plane normal to the cross sectional plane of FIG. 2.
FIG. 4 is an enlarged cross sectional view of the lubricator of this invention as seen in the plane of line IV—IV of FIG. 3.
FIG. 5 is an exploded view of another form of air line lubricator made in accord with the teachings of this invention.
FIG. 6 is a cross sectional view of the lubricator of FIG. 5.
FIG. 7 is a side plan view of the lubricator of FIG. 6 with parts broken away and shown in cross section. The cross sectional plane is normal to the cross sectional plane of FIG. 6.

The fog generating devices of this invention are small and compact units. They include a base member and a passage member, with a liquid reservoir provided therebetween. A port member includes passages for filling the liquid reservoir, an air or gas flow channel, and a conduit, pasageway and pipe means for supplying liquid from the reservoir to the channel. The inlet and outlet for the aeriform fluid are aligned on opposite sides of the passage member but are not connected directly thereacross. A centrally disposed flow channel connects the inlet for the aeriform fluid to the liquid reservoir space. The outlet for the aeriform fluid communicates separately with the liquid reservoir space.

In the devices hereinafter disclosed the aeriform fluid flows through the inlet and into the centrally disposed flow channel. Here, liquid is added to the passing air or gas flow stream. The aeriform fluid and liquid flow into the liquid reservoir space where some of the liquid may be separated out. The liquid saturated air or gas then flows through a duct from the reservoir space to the outlet.

Referring to the drawings in further detail:
The air line lubricator 10 includes a base member 20 and a passage member 30 secured together in axially spaced relation by a stud 40. A reservoir chamber 50 is provided between the base and passage members and a lubricant supply chamber 60 is provided over the passage member. Lubricant supply means 70 extend between the reservoir chamber 50 and supply chamber 60 and lubricant diffusing means 80 are provided centrally of the lubricator 10 within the passage member 30 and stud 40.

The base member 20 is a cylindrical member with an annular groove 21 provided in its upper end. An aperture 22 is provided centrally through the base member and includes a shoulder 23 for receiving the lower end of the stud 40 on an O-ring seal 24 provided thereon. A bolt 25 is received through the lower end of the aperture 22 and into threaded engagement with the stud 40. The head of bolt 25 is recessed within the aperture 22 and bears against an O-ring seal in the shouldered recess thereof.

An opening 26 is provided through the base member 20 to receive a needle control valve which forms part of the lubricant supply means and will be described later. The lower end of the opening 26 is threaded.

The passage member 30 is a cylindrical member having a lubricant supply port 31 provided through one side thereof and in communication with an axially disposed hole 32 leading to the reservoir chamber 50. A small conduit 33 is fitted within the end of hole 32 to extend its length into the reservoir space. A threaded plug 34, with a sealing O-ring, closes the supply port 31.

An air inlet 35 and an outlet 36 are also provided in the passage member 30. The air inlet and outlet are aligned but are not connected across the passage member. They are threaded for connection into an air supply line.

The air inlet 35 connects to a centrally disposed axial channel 37 which extends into the reservoir chamber space 50. The lower end of the channel 37 is threaded to receive the hollow end of the stud 40. The outlet 36 is in communication with a duct 38 that extends axially into the reservoir chamber space 50 off to one side of the stud 40.

The stud 40, which connects the base and passage members 20 and 30, a hollow portion forming a container 41 at its upper end. This container is in communication with the axial supply channel 37 of the passage member. Near the lower end of the stud hollow portion 41 is formed a plurality of tangentially disposed perforations 42 through the side wall of the stud for communication with the reservoir chamber space 50. An O-ring 43 is provided around the stud 40 over the perforations 42. The lower end of the stud 40 is threaded internally to receive the securing bolt 25 of the base member.

In the assembly of the stud 40 with the passage member 30, it will be noted that the perforations 42 are disposed appreciably below the reservoir face of the passage member. This assures that the lubricant exhausted with the air through the perforations 42 will not be deposited directly on the lower face of the passage member.

The reservoir chamber 50 is provided by having a transparent sleeve member 51 received concentrically about the stud 40 between the base and passage members 20 and 30. The lower end of the sleeve 51 is disposed within the annular groove 21 of the base member on an O-ring seal 52 therein. The upper end of the sleeve 51 is received in an annular groove 53, in the bottom of the passage member 30, and against an O-ring seal 54 therein. The transparent sleeve 51 may be marked to show the level of the lubricant to be maintained. The lubricant level is to be below the perforations 42.

The lubricant supply chamber 60 includes a transparent dome member 61 received on the upper end of the passage member 30. The dome member 61 includes a flange 62 which is held on the passage member by a retaining collar 63. An O-ring seal 64 is disposed between the dome and passage member.

The upper end of the passage member 30 is recessed, as at 65, and includes a convex bottom within which is provided a tube 66 that extends down into the channel 37.

The lubricant supply means 70 comprises a passageway 71 formed through the passage member 30. The passageway 71 is connected to the reservoir chamber space 50 by means of a conduit 72 intended to extend below the lubricant level thereof. A gooseneck pipe 73 connects with the upper end of the passageway 71, in the supply chamber 60, and extends directly over the tube 66.

A ball check valve 74 is provided in an enlarged portion of passageway 71 and a needle valve 75 is received within the lower end of the conduit 72. The needle valve 75 is received through the base member 20 via opening 26. The needle valve shank is threaded for adjustment purposes and includes a head 76 accessible below the base member. A guide shield 77 is secured by screws 78 to the bottom of the base member 20 to protect the needle valve 75 against misalignment and total withdrawal.

The lubricant diffusing means 80 includes a flow nozzle forming disk 81 received in the channel 37. The flow nozzle 81 is received against a shoulder in the channel 37 and is held there by the end of the stud 40 urging an O-ring seal 82 thereagainst. The supply tube 66 has its lower end disposed directly within the nozzle 81.

*Modification*

Before describing the operation of the disclosed air line lubricator, a modified structure should be discussed.

The air line lubricator 100 of FIGS. 5–7 is similar to the air line lubricator 10 of FIGS. 1–4, just described. To avoid undue description of the modified structure, those parts which are the same are designated by the same numerals with the prefix "1"; that is, 151 is the sleeve member of the modified structure. Those parts which perform the same general function but are different in some minor respect also have a suffix distinguishing mark "'" after the part designating numeral.

The following description of the air line lubricator 100 will help point up the existing difference in structure.

The stud 140' is threaded at both ends in place of having the bolt retainer 25 of the other structure. The base member 120' simply includes a threaded blind end passage 101 in which the lower end of the stud is received.

The passage member 130' is different with respect to the lubricant supply chamber 160'.

The passage member 130' includes the same reservoir supply port 131, air inlet and outlet 135, 136; and channel 137. The feed tube 166 extends from the different supply chamber 160' in the same manner as before and to within the nozzle member 181.

The supply chamber 160' is provided at the end of a centrally disposed opening 102 which has the upper end of the opening closed by a needle valve 175'. The tapered end of the needle valve 175' extends within the feed tube 166 for regulating the flow of lubricant. A branch duct 103 joins the passageway 171 to the supply chamber 160' and eliminates the gooseneck pipe 73 of the other structure.

The needle valve protective guard or shield 177' is secured to the top of the passage member 130' and is held by a screw 104. A chain connection 105 is provided between the screw 104 and the filler closing plug 134.

The duct 133 to the outlet 136 is shown to include a tubular extension 109. This serves to minimize the wash of lubricant along the bottom surface of the passage member 130' which might creep into the outlet flow passages.

*Operation*

The air line lubricator 10 operates in the following manner.

The air flow is in through inlet 35, down through channel 37, past the flow nozzle member 81, and into the container 41 of the stud 40. The air flows through the perforations 42 which give a turbulating action and into the reservoir chamber space 50. From the reservoir space 50 the air flows through duct 38 and out the outlet 36.

The force of air traveling through the channel 37, through the flow nozzle 81, and past the end of the tube 66, causes a low pressure area to exist within the supply chamber 60. In addition, the rush of air within the reservoir space 50 causes a positive pressure area over the lubricant therein. These two factors contribute to cause the flow of lubricant through the passageway 71, conduit 72, and pipe 73 to the chamber space 60. From here the lubricant is drawn through the tube 66 directly into the air flow stream.

The force of air through the flow nozzle 81 carries lubricant from the tube 66 and dashes it against the bottom of the stud hollow portion 41. The onrush of air carries the broken lubricant particles as a mist or fog through the turbulating perforations 42. The centrifugal swirl of the lubricant saturated air, as it enters the reservoir space 50, assures even further and better mixing of oil and air together.

Those lubricant particles which are too large to remain in suspension for long will be dashed against the side wall of the reservoir space 50 and will flow down the sleeve member 51 to return to the lubricant supply source. The onrush of air entering the reservoir space 50 will carry the saturated air out duct 38 and outlet 36 and on to their destination.

The amount of lubricant saturation required is easily varied by means of the needle valve 75. The more the needle end of the valve restricts conduit 72 the less lubricant will be carried into suspension.

The lubricator 100 operates in essentially the same manner as the lubricator 10. The sight dome 61 is eliminated and the flow control valve 175 is disposed in the passage member. The adjustment of the needle valve 175 in tube 166 provides the same lubricant flow control. The lubricator 100 does include a tubular extension 105 to eliminate any chance of lubricant not in suspension entering the duct 138 and outlet 136.

The lubricators 10 and 100 of this invention are small in size and compact in arrangement. They are highly suited for use with small high speed pneumatic tools. Only the required and necessary amount of lubricant is injected into the air flow stream. No air passes through the lubricators of this invention which is not subjected to having some lubricant suspended therein. Yet in no instance need the exhaust air from the pneumatic tools using these lubricators include any excess lubricant. Only such lubricant as will be used need be injected into the air stream and all non-suspendible lubricant particles are removed before the air passes into the air control system.

While a preferred embodiment of this invention and a modification thereof has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. An air line lubricator, comprising; base and passage members having a connecting stud disposed therebetween and securing said members in axially aligned and spaced relation, a sleeve member received about said stud and between said base and passage members for providing a lubricant reservoir chamber, an indirectly communicating air inlet and outlet formed in said passage member and aligned thereacross, a centrally disposed channel formed in said passage member and having said air inlet in terminal communication therewith, a lubricant receptive hollow portion formed within the passage member engaging end of said stud and in communication with said centrally disposed channel, lubricant dispersing means provided between said centrally disposed channel and said lubricant receptive hollow portion, a plurality of reservoir communicating tangentially directed perforations formed through said stud from said lubricant receptive hollow portion for the further mixture of air and lubricant within said reservoir chamber, and said outlet communicating with said reservoir for the exhaust of lubricant saturated air from said reservoir.

2. An air line lubricator, comprising; a base and passage member having a connecting stud disposed therebetween and securing said members in axially aligned and spaced relation, a sleeve member received about said stud and between said base and passage members for providing a lubricant reservoir chamber, an indirectly communicating air inlet and outlet formed in said passage member and aligned thereacross, a centrally disposed channel formed in said passage member and having said air inlet in terminal communication therewith, a lubricant receptive hollow portion formed within the passage member engaging end of said stud and in communication with said centrally disposed channel, lubricant dispersing means provided between said centrally disposel channel and said lubricant receptive hollow portion, tangentially directed turbulating exhaust means provided between said lubricant receptive tangentially directed hollow portion and said reservoir for further admixing air and lubricant within said reservoir, and a separate duct formed through said passage member between said reservoir and said outlet for the exhaust of lubricant saturated air therethrough.

3. An air line lubricator, comprising; a base and passage member having a connecting stud disposed therebetween and securing said members in axially aligned and spaced relation, a sleeve member received about said stud and between said base and passage member for providing a lubricant reservoir chamber, an indirectly communicating air inlet and outlet formed in said passage member and aligned thereacross, a centrally disposed channel formed in said passage member and having said air inlet in terminal communication therewith, a lubricant receptive container formed within the passage member engaging end of said stud and in communication with said centrally disposed channel, lubricant dispersing means provided between said centrally disposed channel and said lubricant receptive container, tangentially directed turbulating perforations formed through said stud below the reservoir face of said passage member and between said lubricant receptive container and said reservoir space for admixing air and lubricant within said reservoir and for separating out non-suspendible lubricant therein, and duct means extended within said reservoir below the reservoir face of said passage member and in communication with said outlet for the exhaust of lubricant saturated air therethrough.

4. An air line lubricator, comprising; a base and passage member having a connecting stud disposed therebetween and securing said members in axially aligned and spaced relation, a sleeve member received about said stud and between said base and passage member for providing a lubricant reservoir space, an indirectly communicating air inlet and outlet passage formed in said passage member and aligned thereacross, a centrally disposed lubricant receptive channel formed in said passage member and having said air inlet in terminal communicating therewith, said centrally disposed channel extending within the passage member engaging end of said stud, a flow nozzle disposed within said centrally disposed channel between said air inlet and the extension of said central channel within said stud, lubricant supply means provided between said reservoir and said flow nozzle, said supply means being regulatable for controlling the amount of lubricant provided in said central lubricant receptive channel, said supply means being regulated by a valve positioned in said reservoir, a plurality of tangentially disposed perforations formed through said stud for communication between said channel and said reservoir, said tangentially disposed perforations being appreciably spaced from the reservoir face of said passage member, and a separate duct formed through said passage member between said reservoir and said outlet for the exhaust of lubricant saturated air therethrough.

References Cited in the file of this patent

UNITED STATES PATENTS

| | | |
|---|---|---|
| 658,019 | Power | Sept. 18, 1900 |
| 810,686 | Taylor | Jan. 23, 1906 |
| 1,782,741 | Norgren | Nov. 25, 1930 |
| 2,187,241 | Kehle | Jan. 16, 1940 |
| 2,709,577 | Pohndorf | May 31, 1955 |
| 2,710,073 | Faust | June 7, 1955 |
| 2,747,688 | Faust | May 29, 1956 |
| 2,751,045 | Faust | June 19, 1956 |
| 2,767,807 | Booth | Oct. 23, 1956 |

UNITED STATES PATENT OFFICE
CERTIFICATE OF CORRECTION

Patent No. 3,009,542 November 21, 1961

Joseph J. Shada

It is hereby certified that error appears in the above numbered patent requiring correction and that the said Letters Patent should read as corrected below.

Column 6, line 5, for "disposel" read -- disposed --; line 8, strike out "tangentially directed".

Signed and sealed this 3rd day of July 1962.

(SEAL)
Attest:

ERNEST W. SWIDER
Attesting Officer

DAVID L. LADD
Commissioner of Patents